(12) United States Patent  (10) Patent No.: US 6,688,629 B2
Essinger  (45) Date of Patent: Feb. 10, 2004

(54) APPARATUS AND METHOD OF A DUAL ECCENTRIC ADJUSTABLE MOTORCYCLE FOOTREST

(76) Inventor: Mark Essinger, 2505 W. 45th St., Austin, TX (US) 78756

( * ) Notice: Subject to any disclaimer, the term of this patent is extended or adjusted under 35 U.S.C. 154(b) by 0 days.

(21) Appl. No.: 10/064,450

(22) Filed: Jul. 16, 2002

(65) Prior Publication Data

US 2002/0158441 A1 Oct. 31, 2002

Related U.S. Application Data

(63) Continuation-in-part of application No. 09/836,812, filed on Apr. 17, 2001.

(51) Int. Cl.$^7$ ................................................. B62J 25/00
(52) U.S. Cl. ........................................ 280/291; 180/219
(58) Field of Search .................... 180/219; 280/291; 248/299.1, 288.11

(56) References Cited

U.S. PATENT DOCUMENTS 4,456,090 A * 6/1984 Malenotti .................... 180/219
6,152,474 A * 11/2000 Rupert ........................ 280/291
6,173,983 B1 * 1/2001 Moore ........................ 280/291

FOREIGN PATENT DOCUMENTS

JP          4-278889 A   * 10/1992   ................. 280/291

* cited by examiner

*Primary Examiner*—Daniel G. DePumpo
(74) *Attorney, Agent, or Firm*—Taylor Russell & Russell, P.C.

(57) ABSTRACT

The dual eccentric motorcycle footrest provides an infinitely and continuously adjustable motorcycle footrest within a defined area on the side of a motorcycle. It may be adjusted in both a vertical and horizontally direction to satisfy the needs of motorcycle operators with various statures, whether on a racetrack or on streets. Normally used in pairs, one for each side of a motorcycle, the invention relies on two eccentric adjustments to provide a reliable, lightweight, strong, durable and easily adjustable motorcycle enhancement.

20 Claims, 8 Drawing Sheets

APPARATUS AND METHOD OF A DUAL ECCENTRIC ADJUSTABLE MOTORCYCLE FOOTREST

CROSS REFERENCE TO RELATED APPLICATIONS

This application is a continuation-in-part of U.S. patent application Ser. No. 09/836,812 filed on Apr. 17, 2001.

BACKGROUND OF INVENTION

The invention relates generally to the field of motorcycle parts and components, and more particularly to devices that provide durable, lightweight motorcycle footrests having adjustable footrest positions.

Motorcycles are generally delivered from a manufacturer to a purchaser with footrests having fixed positions with respect to the motorcycle frame. One footrest is located on one side of the motorcycle for convenience of shifting gears with one foot of the operator. Another footrest is located on another side of the motorcycle for convenience of operating brakes with the other foot of the operator. There are several reasons for desiring to adjust the position of the footrest locations that are different from the fixed stock positions provided by a manufacturer. The stock positions may be undesirable due to the physical stature of the motorcycle operator. Because of the operator's physical stature, the stock positions may be either too high or too low, and either too far forward or too far rearward. When racing motorcycles, it is often desirable to move the footrests higher and rearward due to the extreme lean angles achieved on closed course racetracks. There is a direct relationship between the lean angle of a motorcycle and its achievable speed when traveling through a given arc when encountering a turn. Higher speeds require greater lean angles. If footrests are positioned too low, they may strike the ground at extreme lean angles, creating a hazard for the motorcycle operator and a potential for crashing. This possibility limits the maximum motorcycle speed when encountering a turn or corner. By adjusting the footrests to a higher position, a motorcycle operator can carry more speed through corners and turns due to greater achievable lean angles. However, when footrests are raised to accommodate extreme lean angles, they must also be adjusted rearward in order to bring the operators' knees down and align the operators' feet in such a way to provide easy actuation of the gearshift and brake foot controls of the motorcycle.

Each motorcycle operator will have a unique opinion about how far up and how far back the footrests should be placed to achieve a comfortable and functional positioning of the footrest on the motorcycle. When riding on public streets at speeds where the clearance between the motorcycle footrests and the ground is not an issue, the motorcycle operator may wish to place the footrests in a lower and further forward position to achieve a more comfortable arrangement. When considering these issues and the variables involved, it is apparent that it would be advantageous to be able to position the footrests in infinitely adjustable horizontal and vertical increments to meet the specific requirements of the motorcycle operator. A further advantage would be providing a method for locking the adjusted position of each footrest with a single tightening means. Furthermore, the footrests should have sufficient strength, durability and ease of adjustment to withstand the environments encountered in motorcycle operation, including closed course racetracks. Existing footrests suffer from a restricted range of adjustment.

SUMMARY OF INVENTION

The present invention includes an apparatus and method for providing motorcycle footrests that have continuous and infinite adjustability over a wide range to accommodate the needs of motorcycle operators of various physical statures. The invention provides both horizontal and vertical adjustability with respect to a frame of a motorcycle. The invention is also capable of satisfying the needs of motorcycle operators whether riding on a racetrack or on public streets and highways. The invention provides footrests that are constructed of materials and in such a fashion to be strong, lightweight, durable and easily adjustable. Embodiments of the invention are capable of being locked into position by tightening a single screw on each footrest.

The invention provides durable, lightweight motorcycle footrests having two overlapping eccentric axis of rotation for adjusting footrest position. The footrest position of the present invention provides infinite and continuous adjustability in a vertical and horizontal position with respect to a motorcycle frame within the limits defined by two concentric circles offset from centers of rotation.

An embodiment of the present invention is a method of a dual eccentric adjustable motorcycle footrest that comprises the steps of fastening a bracket having a circular bracket aperture to a motorcycle frame, rotationally adjusting an angular position of a circular collet placed within the circular bracket aperture, the circular collet having an eccentrically offset collet aperture with respect to a circular collet rotational axis, rotationally adjusting an angular position of a foot peg with respect to a foot peg pivot placed within the offset collet aperture, the foot peg having an eccentrically offset positional relationship with respect to a foot peg pivot rotational axis, and fixing an adjusted position of the foot peg by securing the angular position of the collet in the bracket aperture and the angular position of the foot peg pivot in the collet aperture. The step of fixing an adjusted position may comprise providing a slot in the bracket for enabling a friction fit between the bracket aperture and the collet by reducing a diameter of the bracket aperture, providing a slot in the collet for enabling a friction fit between the collet aperture and the foot peg pivot by reducing a diameter of the collet aperture, and tightening a single securing screw through the bracket slot for creating a friction fit between the bracket aperture and the collet by reducing the diameter of the bracket aperture, and for creating a friction fit between the collet aperture and the foot peg pivot by reducing the diameter of the collet aperture. The step of fixing an adjusted position may comprise providing a slot in the collet for enabling a friction fit between the collet and bracket aperture by increasing a diameter of the collet, creating a counter bored hole along the foot peg pivot axis, the counter bored hole having a slot machined in a side wall parallel to the foot peg pivot axis for increasing a diameter of the foot peg pivot, and inserting a single threaded fastener into the counter bored hole and threading the threaded fastener into a tapered nut, causing the slotted counter bored hole in the foot peg pivot to expand for securing the angular position of the foot peg pivot in the collet aperture and securing the angular position of the collet in the bracket aperture. The method may further comprise providing a slot in the bracket for enabling a friction fit between the bracket aperture and the collet by reducing a diameter of the bracket aperture, and tightening a securing screw through the bracket slot for creating a friction fit between the bracket aperture and the collet by reducing the diameter of the bracket aperture. The step of fixing an adjusted position may comprise providing a slot in the bracket for enabling a friction fit between the bracket aperture and the collet by reducing a diameter of the bracket aperture, providing a slot in the collet for enabling a clamping fit between the collet aperture and the foot peg pivot by reducing a diameter of the collet aperture, machining a spline in the collet aperture and a matching spline on the foot peg pivot, and tightening a single securing screw through the bracket slot for creating a friction fit between the bracket aperture and the collet by reducing the diameter of the bracket aperture, and for creating a clamping fit between the collet aperture and the foot peg pivot by reducing the diameter of the collet aperture. The method may further comprise tapping a threaded hole in the foot peg pivot, and tightening a threaded fastener through the collet aperture into the foot peg pivot tapped hole for creating a clamping fit between the collet and the foot peg pivot. The method may further comprise fastening a right hand dual eccentric motorcycle footrest to a right hand side of a motorcycle and fastening a left hand dual eccentric motorcycle footrest to a left hand side of a motorcycle. The method may further comprise adjusting a vertical and horizontal position of the foot peg by rotationally adjusting the angular position of the circular collet and the angular position of the foot peg pivot.

Another embodiment of the present invention is a method of a dual eccentric adjustable motorcycle footrest that comprises the steps of fastening a bracket having a circular bracket aperture with a bracket aperture centerline to a motorcycle frame, inserting a circular collet having a collet axis and an eccentrically offset collet aperture with a collet aperture centerline into the circular bracket aperture, the collet axis aligning with the bracket aperture centerline, sliding a foot peg pivot having a foot peg pivot axis into the offset collet aperture, the foot peg pivot axis aligning with the collet aperture centerline, eccentrically offsetting a foot peg having a foot peg centerline from the foot peg pivot by a foot peg radial arm fixed between the foot peg and the foot peg pivot, the foot peg centerline being eccentrically offset from the foot peg pivot axis, eccentrically adjusting the position of the foot peg by rotating the collet about the collet axis in the bracket aperture and by rotating the foot peg pivot about the foot peg pivot axis in the collet aperture, and fixing the angular position of the collet in the bracket aperture and the angular position of the foot peg pivot in the collet aperture. The method may further comprise adjusting a vertical and horizontal position of the foot peg by rotationally adjusting the angular position of the circular collet and the angular position of the foot peg pivot. The method may further comprise defining a first eccentric offset as the difference between the a first axis of rotation comprising the collet axis and a second axis of rotation comprising the foot peg axis, defining a second eccentric offset as the difference between the second axis of rotation comprising the foot peg axis and the foot peg centerline, vertically and horizontally adjusting the position of the foot peg over an area outside of an inner concentric circle centered on the collet axis, the inner concentric circle having a radius of the difference the first eccentric offset and the second eccentric offset, and vertically and horizontally adjusting the position of the foot peg over an area inside of an outer concentric circle centered on the collet axis, the outer concentric circle having a radius of the sum the first eccentric offset and the second eccentric offset. The step of fixing an angular position may comprise providing a slot in the bracket for enabling a friction fit between the bracket aperture and the collet by reducing a diameter of the bracket aperture, providing a slot in the collet for enabling a friction fit between the collet aperture and the foot peg pivot by reducing a diameter of the collet aperture, and tightening a single securing screw through the bracket slot for creating a friction fit between the bracket aperture and the collet by reducing the diameter of the bracket aperture, and for creating a friction fit between the collet aperture and the foot peg pivot by reducing the diameter of the collet aperture.

Yet another embodiment of the present invention is a dual eccentric adjustable motorcycle footrest apparatus that comprises a bracket having a circular aperture fastened to a motorcycle frame, a rotatable circular collet placed within the circular bracket aperture, the circular collet having an eccentrically offset collet aperture with respect to a circular collet rotational axis, a foot peg rotatable with respect to a foot peg pivot placed within the collet aperture, the foot peg having an eccentrically offset positional relationship with respect to a foot peg pivot rotational axis, and means for fixing an adjusted position of the foot peg by securing an angular position of the collet in the bracket aperture and an angular position of the foot peg pivot in the collet aperture. The apparatus may further comprise a first eccentric offset comprising a distance between the circular collet rotational axis and a collet aperture center, and a second eccentric offset comprising a distance between the foot peg pivot rotational axis and a centerline of the eccentrically offset foot peg. The foot peg may be adjustable vertically and horizontally over a region defined by an area between an inner concentric circle centered at the circular collet axis of rotation and an outer concentric circle centered at the circular collet axis of rotation, the inner concentric circle having a radius of the difference between first eccentric offset and the second eccentric offset, and the outer concentric circle having a radius of the sum of first eccentric offset and the second eccentric offset. The inner concentric circle may be defined as that circumscribed by the foot peg centerline during a 360° rotation of the rotatable circular collet with the foot peg centerline in a position as close as possible to the center of rotation of the rotatable circular collet, and the outer concentric circle may be defined as that circumscribed by the foot peg centerline during a 360° rotation of the rotatable circular collet with the foot peg centerline in a position as far as possible from the center of rotation of the rotatable circular collet. The bracket may include a slot that is contracted when a securing screw is tightened into a threaded hole for fixing a position of the rotatable circular collet, and the rotatable circular collet may include a slot that is contracted when the securing screw is tightened into the threaded hole for fixing the position of the foot peg. The rotatable foot peg pivot may be fixed in a position using a splined collet aperture and a matching spline on the rotatable foot peg pivot. The rotatable foot peg pivot may be fixed in position using a threaded fastener and a tapered nut.

Another embodiment of the present invention is a dual eccentric adjustable motorcycle footrest kit capable of being assembled in the field, that comprises a bracket having a circular aperture adapted to be fastened to a motorcycle frame, a rotatable circular collet adapted to be placed within the circular bracket aperture, the circular collet having an eccentrically offset collet aperture with respect to a circular collet rotational axis, a foot peg rotatable with respect to a foot peg pivot adapted to be placed within the collet aperture, the foot peg having an eccentrically offset positional relationship with respect to a foot peg pivot rotational axis, and means adapted for fixing an adjusted position of the foot peg by securing an angular position of the collet in the bracket aperture and an angular position of the foot peg pivot in the collet aperture.

DESCRIPTION OF NUMERIC REFERENCES OF INVENTION EMBODIMENTS

100. Right hand dual eccentric motorcycle footrest of the present invention
200. Left hand dual eccentric motorcycle footrest of the present invention
105. Right hand foot peg
205. Left hand foot peg
109. Right hand foot peg radial arm
209. Left hand foot peg radial arm
111. Right hand foot peg pivot slot
113. Right hand foot peg pivot
213. Left hand foot peg pivot
117. Right hand collet
217. Left hand collet
121. Right hand collet aperture
221. Left hand collet aperture
125. Right hand collet slot
225. Left hand collet slot
129. Right hand bracket
229. Left hand bracket
133. Right hand bracket aperture
233. Left hand bracket aperture
137. Right hand bracket slot
237. Left hand bracket slot
141. Right hand upper bolt hole
241. Left hand upper bolt hole
143. Right hand lower bolt hole
243. Left hand lower bolt hole
149. Right hand securing screw in a threaded hole
249. Left hand securing screw in a threaded hole
153. Right hand foot peg centerline
155. Right hand foot peg pivot axis and collet aperture centerline
157. Right hand collet axis and bracket aperture centerline
159. Right hand collet direction and field of rotation
161. Right hand foot peg direction and field of rotation
171. Right hand threaded fastener
173. Right hand tapered nut
175. Right hand foot peg splined pivot
177. Right hand collet splined aperture
179. Washer

BRIEF DESCRIPTION OF DRAWINGS

These and other features, aspects and advantages of the present invention will become better understood with regard to the following description, appended claims, and accompanying drawings wherein:

DETAILED DESCRIPTION

Figure 1:
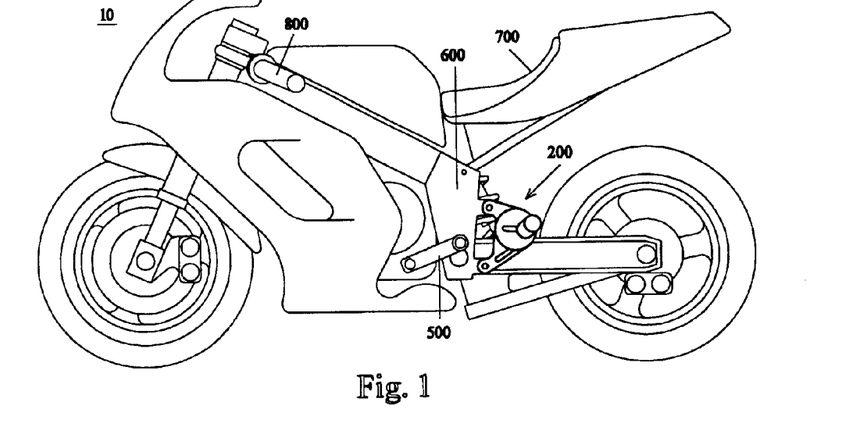
FIG. 1 shows a plane view of the left side of a typical motorcycle depicting the position of the present invention with reference to the motorcycle frame, seat and handlebars.

Turning now to FIG. 1, FIG. 1 shows a plane view of the left side of a typical motorcycle 10 depicting the position of the present invention of a dual eccentric motorcycle footrest 200 with reference to the motorcycle frame 600, seat 700 and handlebars 800. The dual eccentric motorcycle footrest 200 is intended to be used by a motorcycle operator rather than by a motorcycle passenger. Also shown in FIG. 1 is a common configuration of a shift control lever 500, which is operated in association with the dual eccentric footrest 200, but is not part of the present claimed invention. In a typical motorcycle configuration, there is also a right side dual eccentric footrest that is a mirror image of the left side footrest 200 shown in FIG. 1. While a left side footrest is generally used in association with a shift control mechanism, a right side footrest is generally used in association with a brake control mechanism.

Figure 2:
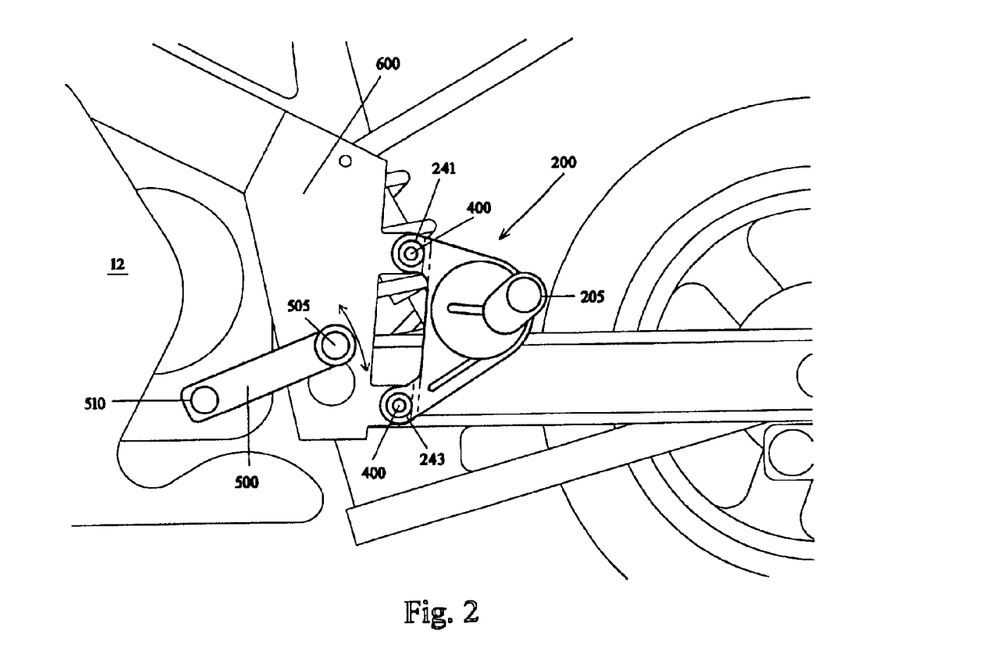
FIG. 2 shows an expanded view of a portion of FIG. 1 depicting the preset invention.

Turning now to FIG. 2, FIG. 2 shows an expanded view of a portion of FIG. 1 depicting the preset invention of a dual eccentric motorcycle footrest 200 attached to a motorcycle 12. The dual eccentric motorcycle footrest 200 is securely mounted to the frame 600 of the motorcycle 12 by threaded fasteners 400 positioned in an upper bolt hole 241 and a lower bolt hole 243 of the dual eccentric motorcycle footrest 200. An operator of the motorcycle 12 positions a left boot on a foot peg 205 of the dual eccentric motorcycle footrest 200. When operating the shift control lever 500, a motorcycle operator positions the left boot to contact a shift control peg 505, causing the shift control lever 500 to incrementally rotate about a shifter shaft 510 connected to a motorcycle transmission. A similar arrangement is positioned on the right side of the motorcycle 12 for actuating a braking mechanism.

Figure 3A:
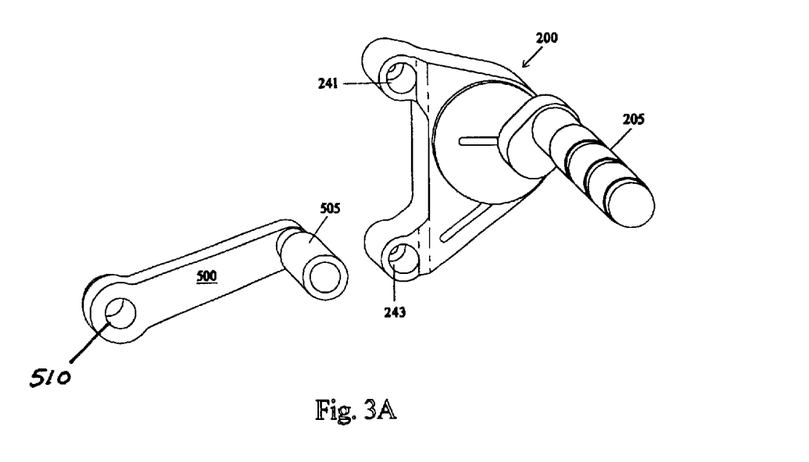
FIG. 3 shows an embodiment of the present invention and depicts its use with respect to a motorcycle operator's boot and an independent control arm.
Figure 3B:
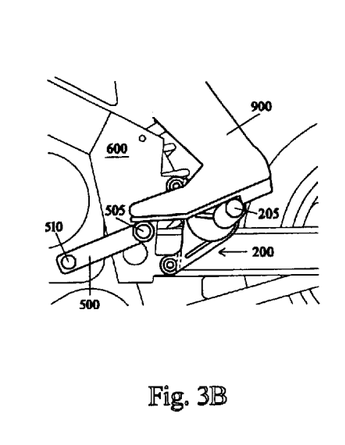
Figure 3C:
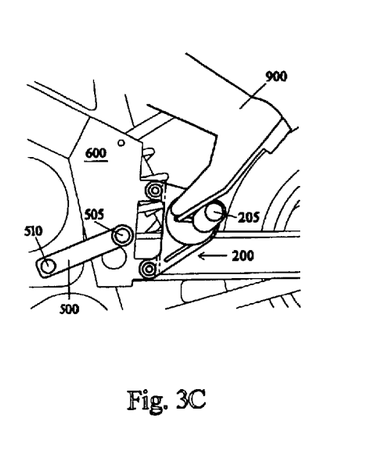

Turning now to FIG. 3, FIG. 3A shows an embodiment of the present invention comprising a left hand dual eccentric motorcycle footrest 200. The left hand dual eccentric motorcycle footrest 200 has a foot peg 205, an upper bolt hole 241 and a lower bolt hole 243. Although not part of the claimed invention, FIG. 3A also shows a shift control lever 500 rotatably mounted to a shifter shaft 510 of a motorcycle. The shift control lever 500 has a shift control peg 505 mounted on an opposite end from the shifter shaft 510. FIG. 3B depicts the position of a left boot 900 of a motorcycle operator in a normal riding position with the ball of the foot on the foot peg 205 of the dual eccentric motorcycle footrest 200 securely mounted on the motorcycle frame 600. Also shown in FIG. 3B is the shift control peg 505 mounted on the shift control lever 500 connected to the shifter shaft 510. FIG. 3C depicts the position of the boot 900 of a motorcycle operator moved forward in a position to enable the toe of the boot 900 to move the shift control peg 505 up and down. This moves the shift control lever 500 such that the shifter shaft 510 incrementally rotates, causing the motorcycle transmission to shift gears. Although an embodiment of the claimed invention shown in FIG. 3A, FIG. 3B and FIG. 3C illustrate how the claimed invention may be used in association with control mechanisms 500, 505, 510 of a motorcycle, the control mechanisms 500, 505, 510 are not part of the claimed invention.

Figure 4A:
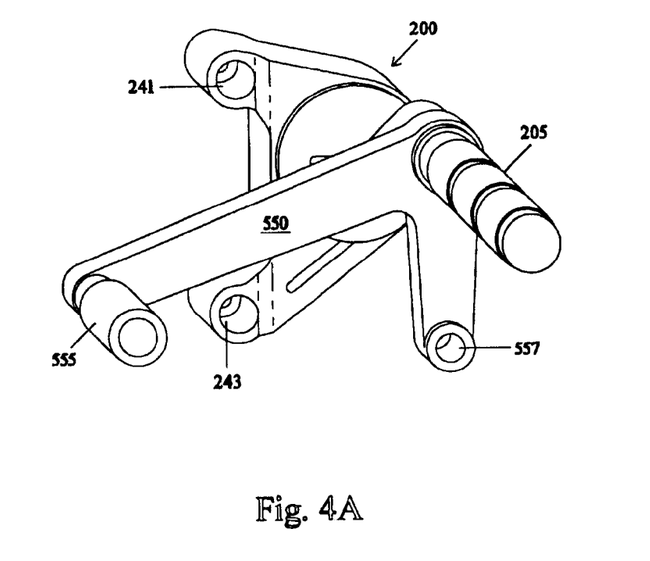
FIG. 4 shows an embodiment of the present invention and depicts its use with respect to a motorcycle operator's boot and an integrated control arm.
Figure 4B:
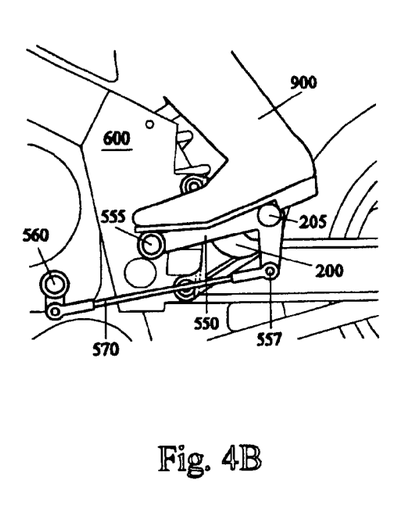
Figure 4C:
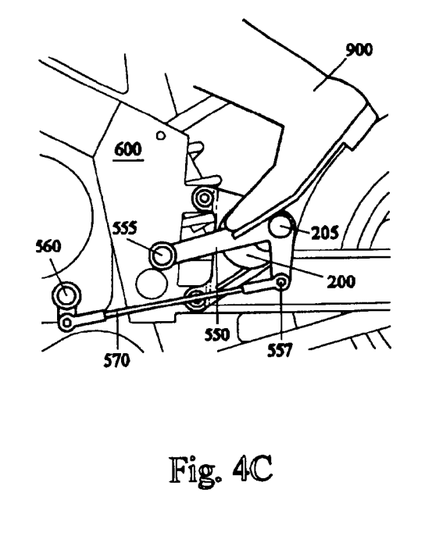

Turning now to FIG. 4, FIG. 4A shows another embodiment of the present invention comprising a left hand dual eccentric motorcycle footrest 200. The left hand dual eccentric motorcycle footrest 200 has a foot peg 205, an upper bolt hole 241 and a lower bolt hole 243. Although not part of the claimed invention, FIG. 4A also shows a shift control lever 550 rotatably mounted at a base of the foot peg 205. The shift control lever 550 has a shift control peg 555 and a shift linkage hole 557 for connection to a shifter shaft of a motorcycle transmission. FIG. 4B depicts the position of a left boot 900 of a motorcycle operator in a normal riding position with the ball of the foot on the foot peg 205 of the dual eccentric motorcycle footrest 200 securely mounted on the motorcycle frame 600. Also shown in FIG. 4B is the shift control peg 555 mounted on the shift control lever 550 connected to a shifter shaft 560 by a shift linkage 570 connected between the linkage hole 557 and the shifter shaft 560. FIG. 4C depicts the position of the left boot 900 of a motorcycle operator moved forward in a position to enable the toe of the boot 900 to move the shift control peg 555 up and down. This moves the shift control lever 550 such that the shift linkage 570 connected between the linkage hole 557 and the shifter shaft 560 causes the shifter shaft 560 to incrementally rotate, causing the motorcycle transmission to shift gears. Although an embodiment of the claimed invention shown in FIG. 4A, FIG. 4B and FIG. 4C illustrate how the claimed invention may be used in association with control mechanisms 550, 555, 557, 560, 570 of a motorcycle, the control mechanisms 550, 555, 557, 560, 570 are not part of the claimed invention.

Figures 5A, 5B:
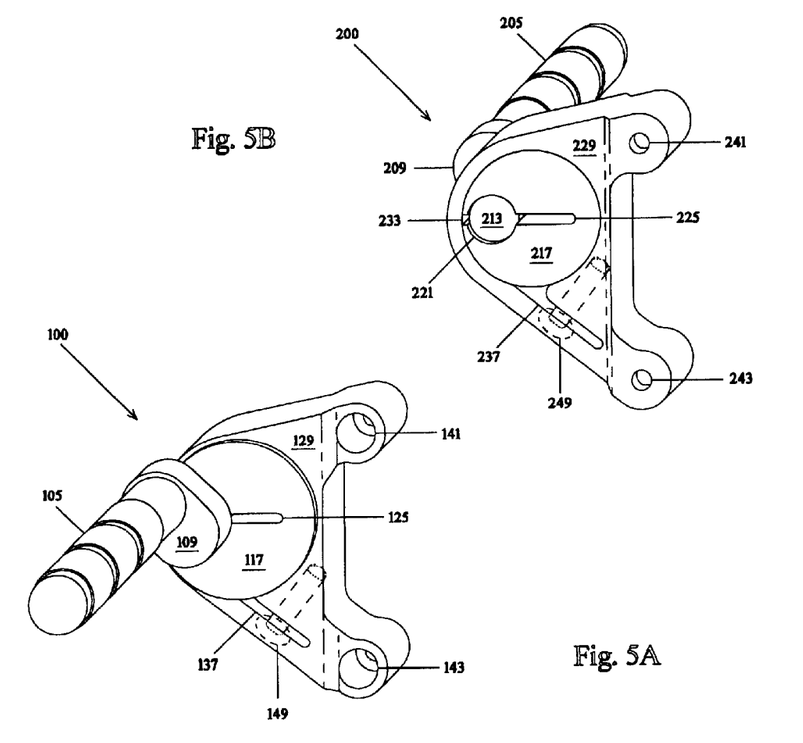
FIG. 5 shows a perspective view of an embodiment of the present invention depicting both right hand side and left hand side footrest assemblies.

Turning now to FIG. 5, FIG. 5A shows a perspective view of an embodiment of the present invention depicting a right hand side footrest assembly 100 and FIG. 5B shows a perspective view of an embodiment of the present invention depicting a left hand side footrest assembly 200. FIG. 5A shows an embodiment of the present invention 100 suitable for attachment to the right side of a motorcycle frame by fastening means inserted into a right hand upper bolt hole 141 and a right hand lower bolt hole 143. FIG. 5B shows an embodiment of the present invention 200 suitable for attachment to the left side of a motorcycle frame by fastening means inserted into a left hand upper bolt hole 241 and a left hand lower bolt hole 243. In normal use, it is anticipated that a motorcycle operator will prefer to use a left hand version and a right hand version for each side of a motorcycle for supporting a left foot and a right foot, respectively. The right hand version and the left hand version are typically mirror images of one another. The invention may be assembled from machined, fabricated or cast components. The component materials may be selected from various materials, including but not limited to magnesium, titanium, aluminum, steel or carbon fiber.

FIG. 5A depicts the major components of the right hand dual eccentric footrest 100 of the present invention. A right hand foot peg 105 is offset from its center of rotation by a right hand radial arm 109. The right hand foot peg 105 and radial arm 109 may eccentrically rotate about a center of rotation comprising the center of a right hand foot peg pivot (not shown) centered in an offset right hand collet aperture (not shown) in a right hand collet 117. The right hand collet 117 has a right hand collet slot 125 that enables tightening of the collet slot 125 to frictionally fix an angular position of the right hand foot peg 105, the right hand foot peg radial arm 109, and the right hand foot pivot (not shown) in the right hand collet aperture (not shown). Furthermore, the right hand collet aperture (not shown), the right hand foot peg radial arm 109 and the right hand foot peg 105 may also eccentrically rotate about a center of rotation comprising the center of the right hand collet 117. The right hand collet 117 may be rotatably positioned within a right hand bracket aperture (not shown) in a right hand bracket 129. The right hand bracket 129 has a right hand bracket slot 137 and a right hand securing screw in a threaded hole 149. The right hand securing screw in a threaded hole 149 provides a single position fixing means that enables tightening of the right hand bracket slot 137 to frictionally fix an angular position of the right hand collet 117 within the right hand bracket 129, and to frictionally fit an angular position of the right hand foot peg 105, the right hand foot peg radial arm 109, and the right hand foot pivot (not shown) in the right hand collet aperture (not shown). The right hand bracket 129 includes a right hand upper bolt hole 141 and a right hand lower bolt hole 143 to enable mounting the right hand bracket 129 to a motorcycle frame using suitable fasteners.

FIG. 5B depicts the major components of the left hand dual eccentric footrest 200 of the present invention. A left hand foot peg 205 is offset from its center of rotation by a left hand radial arm 209. The left hand foot peg 205 and radial arm 209 may eccentrically rotate about a center of rotation comprising the center of a left hand foot peg pivot 213 centered in an offset left hand collet aperture 221 in a left hand collet 217. The left hand collet 217 has a left hand collet slot 225 that enables tightening of the collet slot 225 to frictionally fix an angular position of the left hand foot peg 205, the left hand foot peg radial arm 209, and the left hand foot pivot 213 in the left hand collet aperture 221. Furthermore, the left hand collet aperture 221, the left hand foot peg radial arm 209 and the left hand foot peg 205 may also eccentrically rotate about a center of rotation comprising the center of the left hand collet 217. The left hand collet 217 may be rotatably positioned within a left hand bracket aperture 233 in a left hand bracket 229. The left hand bracket 229 has a left hand bracket slot 237 and a left hand securing screw in a threaded hole 249. The left hand securing screw in a threaded hole 249 provides a single position fixing means that enables tightening of the left hand bracket slot 237 to frictionally fix an angular position of the left hand collet 217 within the left hand bracket 229, and to frictionally fit an angular position of the left hand foot peg 205, the left hand foot peg radial arm 209, and the left hand foot pivot 213 in the left hand collet aperture 221. The left hand bracket 229 includes a left hand upper bolt hole 241 and a left hand lower bolt hole 243 to enable mounting the left hand bracket 229 to a motorcycle frame using suitable fasteners.

Figure 6:
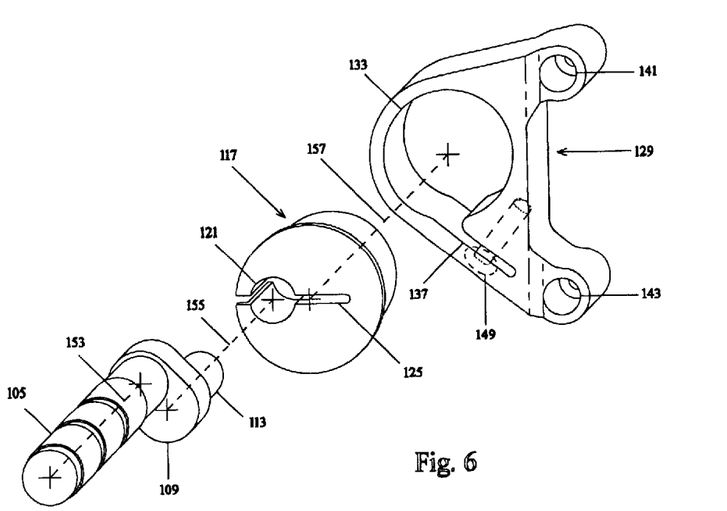
FIG. 6 shows a perspective view of an embodiment of a right hand footrest in a disassembled condition.

Turning to FIG. 6, FIG. 6 shows a perspective view of an embodiment of a right hand footrest 100 in a disassembled condition. To further clarify the description of the present invention, a right hand foot peg centerline 153, a right hand foot peg pivot axis 155, and a right hand collet axis and bracket aperture centerline 157 are identified in FIG. 6. To assemble the right hand version of the present invention 100, the right hand collet 117 is slideably inserted along the right hand collet axis and bracket aperture centerline 157 into the right hand bracket aperture 133 in the right hand bracket 129. Prior to determining a final eccentrically rotatable position of the right hand collet 117 within the right hand bracket aperture 133, the right hand collet 117 is rotated about the right hand collet axis and bracket aperture centerline 157 for positioning. Prior to tightening the right hand securing screw in a threaded hole 149 shown in FIG. 6, the right hand foot peg pivot 113 is slideably inserted along the right hand foot peg pivot axis and collet aperture centerline 155 into the right hand collet aperture 121 of the right hand collet 117. Prior to determining a final eccentrically rotatable position of the right hand foot peg pivot 133 within the right hand collet aperture 121, the right hand foot peg centerline 153 of the right hand foot peg 105 is rotated about the right hand pivot axis and collet aperture centerline 155 for positioning. Once all component positions of the right hand footrest 100 have been finally determined, a right hand securing screw in a threaded hole 149 is tightened to frictionally secure all components in a fixed position by narrowing the right hand bracket slot 137 and the right hand collet slot 125.

Regarding FIG. 6, tightening the right hand securing screw in a threaded hole 149 causes the pinching together of the right hand bracket slot 137, which in turn causes a reduction of the circumference if the right hand bracket aperture 133. The reduction in the circumference of the right hand bracket aperture 133 frictionally binds the right hand collet 117 in position within the right hand bracket aperture 133, and causes pinching together of the right hand collet slot 125. The pinching together of the right hand collet slot 125 causes a reduction in the circumference of the right hand collet aperture 121. The reduction in the circumference of the right hand collet aperture 121 frictionally binds the right hand peg pivot 113 in position within the right hand collet aperture 121. Accordingly, the tightening of a single screw, the right hand securing screw in a threaded hole 149, causes all components of the dual eccentric motorcycle footrest 100 to frictionally bind together such that adjustability and rotatability of these components relative to one another are fixed.

Although not shown in FIG. 6, the dual eccentric footrest 100 is generally attached to the frame of a motorcycle by inserting bolts through the right hand bracket upper bolt hole 141 and the right hand bracket lower bolt hole 143 and screwably inserting the bolts into threaded holes in the motorcycle frame. While threaded bolt holes in the motorcycle frame may be obtained by drilling and tapping holes in user selected positions on the motorcycle frame, it is common for the motorcycle manufacturer to provide threaded bolt holes for mounting footrests. Accordingly, numerous variations of positions of the right hand bolt holes 141, 143 are possible in order to accommodate the pre-existing positions of the manufacturer's footrest attachment bolt holes. The position of such footrest attachment bolt holes, whether pre-existing threaded bolt holes provided by the manufacturer or user selected bolt holes are drilled and tapped, is such that the foot peg of the preferred embodiment when installed on the motorcycle will extend perpendicularly from the vertical plane through the center of the upright motorcycle. Therefore, the foot peg of the preferred embodiment, whether the right hand foot 105 or the left hand foot peg 205, is adjustable in a vertical plane defined by the bracket, either right hand 129 or left hand 229, which is attached to the frame of an upright motorcycle.

In FIG. 6, the right hand upper bolt hole 141, the right hand lower bolt hole 143, and the right hand collet axis and bracket aperture centerline 157 have a triangle relationship that will necessarily be modified to meet the requirements of each make and model of motorcycle, as dictated by the position of the stock bolt holes and their relationship to the stock footrest position as prearranged by each motorcycle manufacturer. The right hand collet axis is concentric with the bracket aperture centerline 157, and the right hand foot peg pivot axis and collet aperture centerline 155 is eccentric with the right hand collet axis and bracket aperture centerline 157. The radial position of the right hand foot peg pivot axis and collet aperture centerline 155 is adjusted within the scope of a circumference defined by the eccentricity of the right hand foot peg pivot axis and collet aperture centerline 155 when rotated about the right hand collet axis and bracket aperture centerline 157. The right hand foot peg pivot axis is concentric with the collet aperture centerline 155. The right hand foot peg centerline 153 has an eccentric relationship with the right hand foot peg pivot axis and collet aperture centerline 155. The radial position of the foot peg 105 is adjusted within the scope of a circumference defined by the eccentricity of the right hand foot peg axis and collet aperture centerline 155 when rotated about the axis of the foot peg pivot.

Figure 7:
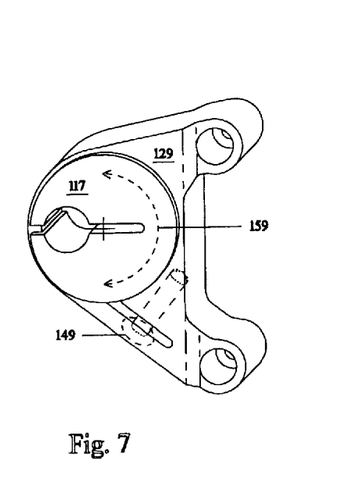
FIG. 7 shows a perspective view of an embodiment of an assembled collet and bracket.

Turning now to FIG. 7, FIG. 7 shows a perspective view of an embodiment of an assembled collet and bracket. The present invention is characterized as a dual eccentric motorcycle footrest that provides adjustment of the position of a foot peg over an area covered by two overlapping eccentric circles. The right hand collet 117 is rotatable within the right hand bracket 129 shown in FIG. 7. It provides a first eccentric offset, represented by the offset of the center of the collet aperture from the collet axis, which is rotatable 159 within the right hand bracket aperture 133 over angles of 360°. The angle of rotation of the collet aperture is fixed by tightening the right hand securing screw in a threaded hole 149.

Figure 8:
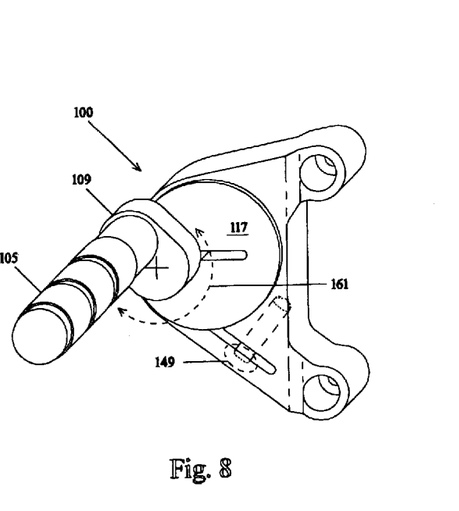
FIG. 8 shows a perspective view of an embodiment of a right hand footrest in an assembled condition.

Turning to FIG. 8, FIG. 8 shows a perspective view of an embodiment of a right hand footrest in an assembled condition. The right hand foot peg 105 is rotatable 161 within the right hand collet aperture 133 over angles of 360°. It provides a second eccentric offset, represented by the offset of the right hand foot peg centerline 153 from the right hand foot peg pivot axis and collet aperture centerline 155. The length of the right hand foot peg radial arm 109 determines the second offset. Thus, the position of the right hand footrest 105 may be adjusted continuously over the area defined as the area concentric with both the right hand bracket aperture centerline 157 and the right hand collet aperture centerline 155. This area may be represented by an area between concentric circles having different diameters, where an outer boundary diameter is equal to the sum of the right hand foot peg offset (second offset) and the right hand collet aperture offset (first offset), and the inner boundary diameter is equal to the difference between the right hand foot peg offset (second offset) and the right hand collet aperture offset (first offset). The first and second offsets may be chosen such that the difference between the two offsets is zero, or a positive or negative number. In an embodiment, the difference between the two offsets is zero, so that the adjustment range of the right hand foot peg may be made vertically and horizontally over all positions within the area defined by the sum of the offsets, as described above.

Figure 9:
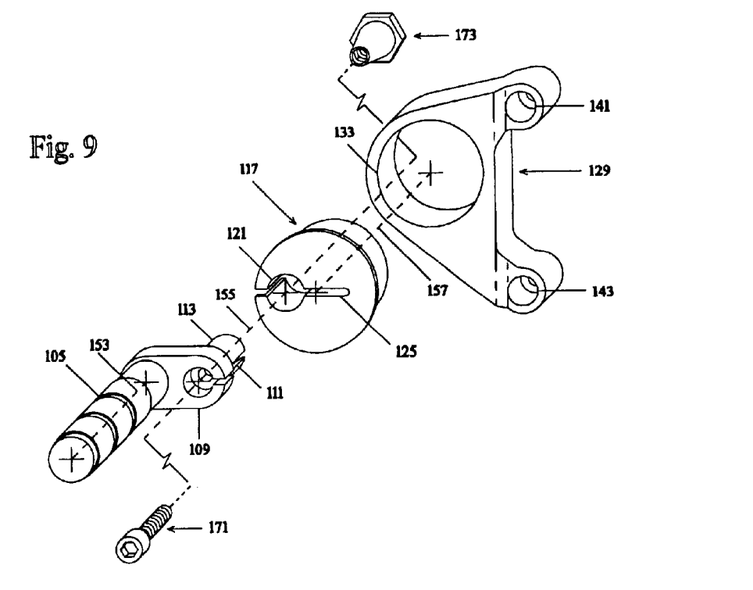
FIG. 9 shows a perspective view of an embodiment of a disassembled right hand footrest that relies on a single threaded fastener and a tapered nut for fixing position of the footrest.

Turning now to FIG. 9, FIG. 9 shows a perspective view of an embodiment of a disassembled right hand footrest that relies on a single threaded fastener and a tapered nut for fixing position of the footrest. In this embodiment of the present invention, a right hand foot peg centerline 153, a right hand foot peg pivot axis 155, and a right hand collet axis and bracket aperture centerline 157 are identified. To assemble the right hand version of this embodiment of the present invention, the right hand collet 117 is slideably inserted along the right hand collet axis and bracket aperture centerline 157 into the right hand bracket aperture 133 in the right hand bracket 129. Prior to determining a final eccentrically rotatable position of the right hand collet 117 within the right hand bracket aperture 133, the right hand collet 117 is rotated about the right hand collet axis and bracket aperture centerline 157 for positioning. The right hand foot peg pivot 113 is slideably inserted along the right hand foot peg pivot axis and collet aperture centerline 155 into the right hand collet aperture 121 of the right hand collet 117. Prior to determining a final eccentrically rotatable position of the right hand foot peg pivot 113 within the right hand collet aperture 121, the right hand foot peg centerline 153 of the right hand foot peg 105 is rotated about the right hand pivot axis and collet aperture centerline 155 for positioning of the right hand foot peg. Once all component positions of the right hand footrest have been finally determined, a right hand securing screw 171 is inserted into a slotted tapered hole 111 in the right hand foot peg pivot 113, which is positioned within the right hand collet aperture 121 having a slot 125. A tapered nut 173 is screwed into the securing screw 171 in the back side if the slotted hole 111. When the slotted nut 173 is tightened, the slotted hole 111 is caused to expand, further causing the slotted right hand collet aperture 121 to expand. This expansion causes a friction fit between the right hand foot peg pivot 113, the right hand collet aperture 121 and the right hand bracket aperture 133. This friction fit causes the components of the right hand dual eccentric motorcycle footrest to be securely fixed in a selected position using a single fastening mechanism.

Figure 10:
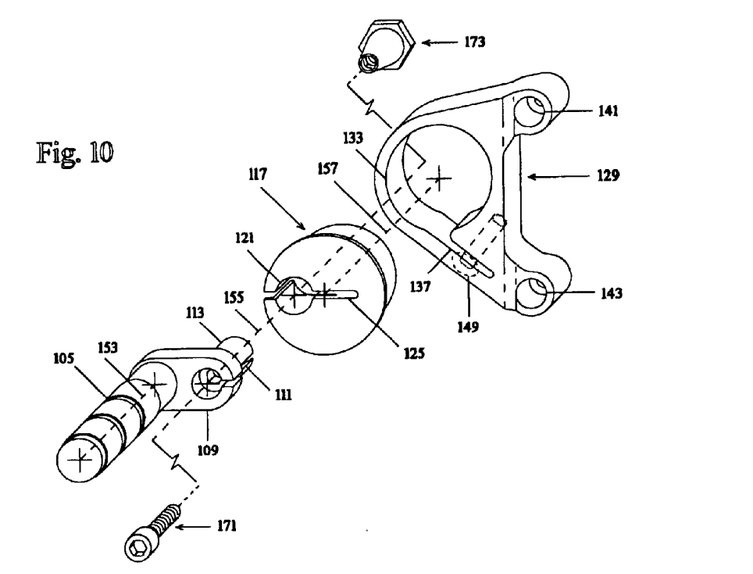
FIG. 10 shows a perspective view of an embodiment of a disassembled right hand footrest that relies on two threaded fasteners and a tapered nut for fixing position of the footrest.

Turning now to FIG. 10, FIG. 10 shows a perspective view of an embodiment of a disassembled right hand footrest that relies on two threaded fasteners and a tapered nut for fixing position of the footrest. This footrest component configuration is the same as described in FIG. 9, but has the additional right hand securing nut in a threaded hole, as described in FIG. 6. For brevity, a description of this combination of two embodiments described above will not be repeated.

Figure 11:
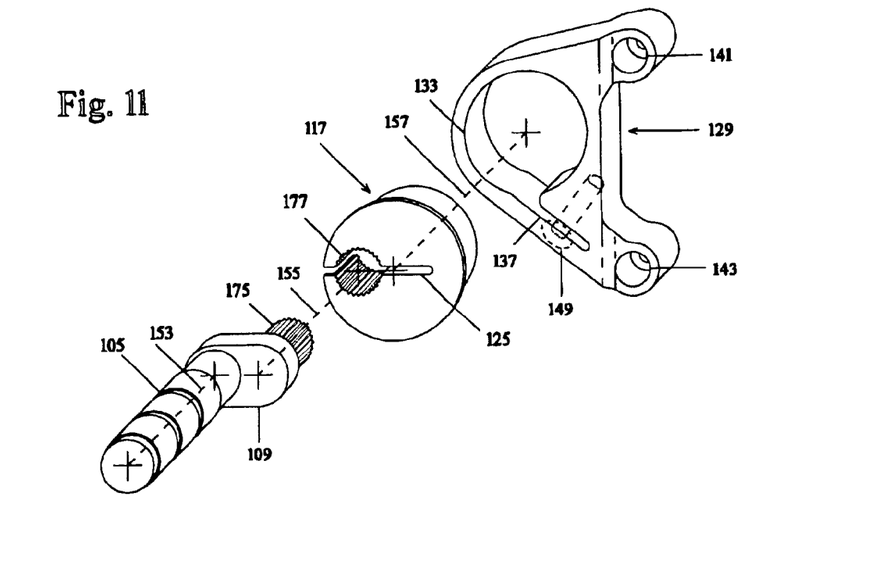
FIG. 11 shows a perspective view of an embodiment of a disassembled right hand footrest that relies on a single threaded fastener, a splined pivot and a splined hole for fixing position of the footrest.

Turning now to FIG. 11, FIG. 11 shows a perspective view of an embodiment of a disassembled right hand footrest that relies on a single threaded fastener, a splined pivot and a splined hole for fixing position of the footrest. In this embodiment of the present invention, a right hand foot peg centerline 153, a right hand foot peg pivot axis 155, and a right hand collet axis and bracket aperture centerline 157 are identified. To assemble the right hand version of this embodiment of the present invention, the right hand collet 117 is slideably inserted along the right hand collet axis and bracket aperture centerline 157 into the right hand bracket aperture 133 in the right hand bracket 129. Prior to determining a final eccentrically rotatable position of the right hand collet 117 within the right hand bracket aperture 133, the right hand collet 117 is rotated about the right hand collet axis and bracket aperture centerline 157 for positioning. The splined right hand foot peg pivot 175 is slideably inserted along the right hand foot peg pivot axis and collet aperture centerline 155 into the splined right hand collet aperture 177 of the right hand collet 117. Prior to determining a final eccentrically rotatable position of the splined right hand foot peg pivot 175 within the splined right hand collet aperture 177, the right hand foot peg centerline 153 of the right hand foot peg 105 is rotated about the right hand pivot axis and collet aperture centerline 155 for positioning of the right hand foot peg 105. The spline of the splined right hand foot peg pivot 175 matches the spine of the splined right hand collet aperture 177. Once all component positions of the right hand footrest have been finally determined, a right hand securing screw in a threaded hole 149 is tightened, causing a contraction of the right hand bracket slot 137 and providing a fixed friction fit between the right hand bracket aperture 133 and the right hand collet 117, securely fixing the angular position of the right hand collet 117 in the right hand bracket aperture 133. The tightening of the right hand securing screw in a threaded hole 149 also causes the right hand collet slot 125 to contract, causing the spline of the splined right hand foot peg pivot 175 to fixably engage the spline of the splined right hand collet aperture 177, and causing a friction fit between the splined right hand foot peg pivot 175 and the splined right hand collet aperture 177. This securely fixes the position of the splined right hand peg pivot 175, and thus the right hand foot peg 105, in the splined right hand collet aperture 177. This friction fit causes the components of the right hand dual eccentric motorcycle footrest to be securely fixed in a selected position using a single fastening mechanism.

Figure 12:
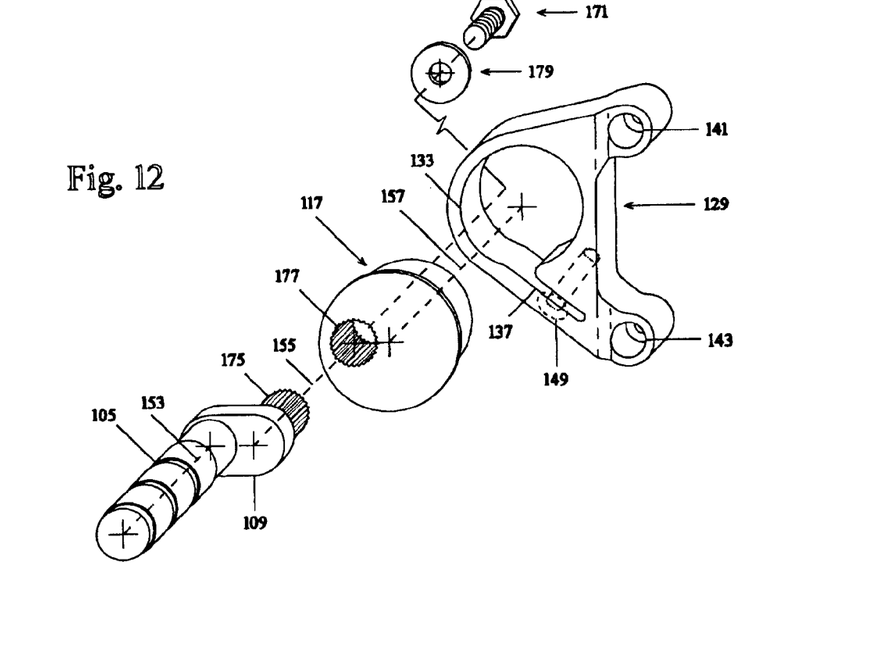
FIG. 12 shows a perspective view of an embodiment of a disassembled right hand footrest that relies on two threaded fasteners, a splined pivot and a splined hole for fixing position of the footrest.

Turning now to FIG. 12, FIG. 12 shows a perspective view of an embodiment of a disassembled right hand footrest that relies on two threaded fasteners, a splined pivot and a splined hole for fixing position of the footrest. In this embodiment of the present invention, a right hand foot peg centerline 153, a right hand foot peg pivot axis 155, and a right hand collet axis and bracket aperture centerline 157 are identified. To assemble the right hand version of this embodiment of the present invention, the right hand collet 117 is slideably inserted along the right hand collet axis and bracket aperture centerline 157 into the right hand bracket aperture 133 in the right hand bracket 129. Prior to determining a final eccentrically rotatable position of the right hand collet 117 within the right hand bracket aperture 133, the right hand collet 117 is rotated about the right hand collet axis and bracket aperture centerline 157 for positioning. The splined right hand foot peg pivot 175 is slideably inserted along the right hand foot peg pivot axis and collet aperture centerline 155 into the splined right hand collet aperture 177 of the right hand collet 117. Prior to determining a final eccentrically rotatable position of the splined right hand foot peg pivot 175 within the splined right hand collet aperture 177, the right hand foot peg centerline 153 of the right hand foot peg 105 is rotated about the right hand pivot axis and collet aperture centerline 155 for positioning of the right hand foot peg 105. The spline of the splined right hand foot peg pivot 175 matches the spline of the splined right hand collet aperture 177. Once all component positions of the right hand footrest have been finally determined, a right hand securing screw in a threaded hole 149 is tightened, causing a contraction of the right hand bracket slot 137 and providing a fixed friction fit between the right hand bracket aperture 133 and the right hand collet 117, securely fixing the angular position of the right hand collet 117 in the right hand bracket aperture 133. By tightening of a right hand footrest threaded fastener 171 into a threaded hole in the splined right hand foot peg pivot 175, a friction fit is created between the right hand footrest threaded fastener 171, the washer 179 and the splined right hand foot peg pivot 175, causing the spline of the splined right hand foot peg pivot 175 to fixably engage the spline of the splined right hand collet aperture 177. This securely fixes the position of the splined right hand peg pivot 175, and thus the right hand foot peg 105, in the splined right hand collet aperture 177. This friction fit causes the components of the right hand dual eccentric motorcycle footrest to be securely fixed in a selected position using two fastening mechanism.

Figure 13:
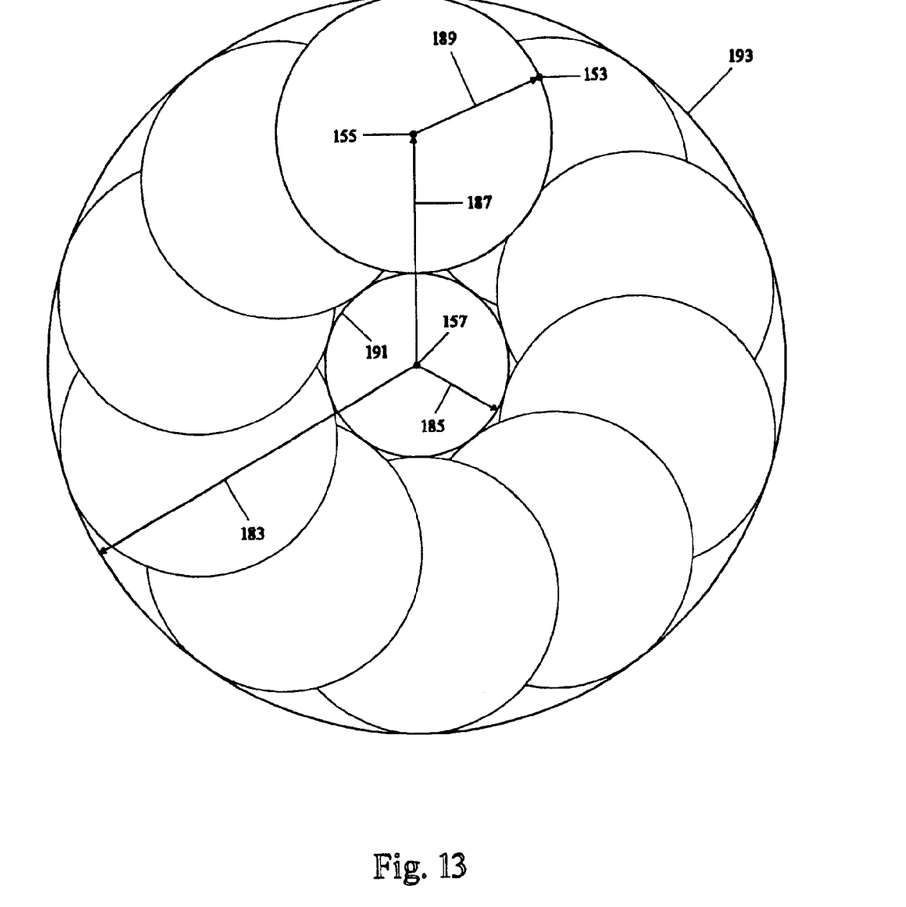
FIG. 13 shows an area of foot peg adjustability between an outer concentric circle and an inner concentric circle, where the diameters of the concentric circles are determined by the sum and difference, respectively, of a first eccentric offset and a second eccentric offset.

It should also be noted that the present invention of a dual eccentric motorcycle footrest relies on two eccentric axes that are each offset from a geometrical center of rotation, as illustrated in FIG. 6 through FIG. 12. As illustrated in FIG. 13, the first eccentric offset 187 is represented by the difference between the first axis of rotation, comprising the right hand collet axis and bracket aperture centerline 157, and a second center of rotation comprising the right hand foot peg axis and collet aperture centerline 155. The second eccentric offset 189 is represented by the difference between the right hand foot peg axis and collet aperture centerline 155 and the right hand foot peg centerline 153. These two eccentric offsets enable two independent rotational adjustments of the footrest components for positioning of the right hand foot peg within the area defined between the perimeter of an inner circle 191 and an outer circle 193, as shown in FIG. 13. The diameter of the outer concentric circle 183 is determined by the sum of the first eccentric offset 187 and second eccentric offset 189 while the diameter of the inner concentric circle 185 is determined by the difference between the first eccentric offset 187 and second eccentric offset 189.

Note that since the left hand dual eccentric footrest is a mirror image of the right hand dual eccentric footrest, a detailed description of the left hand dual eccentric footrest in addition to the present description of the right hand dual eccentric footrest is not deemed necessary to an understanding of the present invention.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method of a dual eccentric adjustable motorcycle footrest, comprising the steps of:
    fastening a bracket having a circular bracket aperture to a motorcycle frame;
    rotationally adjusting an angular position of a circular collet placed within the circular bracket aperture, the circular collet having an eccentrically offset collet aperture with respect to a circular collet rotational axis;
    rotationally adjusting an angular position of a foot peg with respect to a foot peg pivot placed within the offset collet aperture, the foot peg having an eccentrically offset positional relationship with respect to a foot peg pivot rotational axis; and
    fixing an adjusted position of the foot peg by securing the angular position of the collet in the bracket aperture and the angular position of the foot peg pivot in the collet aperture.

2. The method of claim 1, wherein the step of fixing an adjusted position comprises:
    providing a slot in the bracket for enabling a friction fit between the bracket aperture and the collet by reducing a diameter of the bracket aperture;
    providing a slot in the collet for enabling a friction fit between the collet aperture and the foot peg pivot by reducing a diameter of the collet aperture; and
    tightening a single securing screw through the bracket slot for creating a friction fit between the bracket aperture and the collet by reducing the diameter of the bracket aperture, and for creating a friction fit between the collet aperture and the foot peg pivot by reducing the diameter of the collet aperture.

3. The method of claim 1, wherein the step of fixing an adjusted position comprises:
    providing a slot in the collet for enabling a friction fit between the collet and bracket aperture by increasing a diameter of the collet;
    creating a counter bored hole along the foot peg pivot axis, the counter bored hole having a slot machined in a side wall parallel to the foot peg pivot axis for increasing a diameter of the foot peg pivot; and
    inserting a single threaded fastener into the counter bored hole and threading the threaded fastener into a tapered nut, causing the slotted counter bored hole in the foot peg pivot to expand for securing the angular position of the foot peg pivot in the collet aperture and securing the angular position of the collet in the bracket aperture.

4. The method of claim 3, further comprising:
    providing a slot in the bracket for enabling a friction fit between the bracket aperture and the collet by reducing a diameter of the bracket aperture; and
    tightening a securing screw through the bracket slot for creating a friction fit between the bracket aperture and the collet by reducing the diameter of the bracket aperture.

5. The method of claim 1, wherein the step of fixing an adjusted position comprises:
    providing a slot in the bracket for enabling a friction fit between the bracket aperture and the collet by reducing a diameter of the bracket aperture;
    providing a slot in the collet for enabling a clamping fit between the collet aperture and the foot peg pivot by reducing a diameter of the collet aperture;
    machining a spline in the collet aperture and a matching spline on the foot peg pivot; and
    tightening a single securing screw through the bracket slot for creating a friction fit between the bracket aperture and the collet by reducing the diameter of the bracket aperture, and for creating a clamping fit between the collet aperture and the foot peg pivot by reducing the diameter of the collet aperture.

6. The method of claim 5, further comprising:
    tapping a threaded hole in the foot peg pivot; and
    tightening a threaded fastener through the collet aperture into the foot peg pivot tapped hole for creating a clamping fit between the collet and the foot peg pivot.

7. The method of claim 1, further comprising fastening a right hand dual eccentric motorcycle footrest to a right hand side of a motorcycle and fastening a left hand dual eccentric motorcycle footrest to a left hand side of a motorcycle.

8. The method of claim 1, further comprising adjusting a vertical and horizontal position of the foot peg by rotationally adjusting the angular position of the circular collet and the angular position of the foot peg pivot.

9. A method of a dual eccentric adjustable motorcycle footrest, comprising the steps of:
   fastening a bracket having a circular bracket aperture with a bracket aperture centerline to a motorcycle frame;
   inserting a circular collet having a collet axis and an eccentrically offset collet aperture with a collet aperture centerline into the circular bracket aperture, the collet axis aligning with the bracket aperture centerline;
   sliding a foot peg pivot having a foot peg pivot axis into the offset collet aperture, the foot peg pivot axis aligning with the collet aperture centerline;
   eccentrically offsetting a foot peg having a foot peg centerline from the foot peg pivot by a foot peg radial arm fixed between the foot peg and the foot peg pivot, the foot peg centerline being eccentrically offset from the foot peg pivot axis;
   eccentrically adjusting the position of the foot peg by rotating the collet about the collet axis in the bracket aperture and by rotating the foot peg pivot about the foot peg pivot axis in the collet aperture; and
   fixing the angular position of the collet in the bracket aperture and the angular position of the foot peg pivot in the collet aperture.

10. The method of claim 9, further comprising adjusting a vertical and horizontal position of the foot peg by rotationally adjusting the angular position of the circular collet and the angular position of the foot peg pivot.

11. The method of claim 9, further comprising:
   defining a first eccentric offset as the difference between the a first axis of rotation comprising the collet axis and a second axis of rotation comprising the foot peg axis;
   defining a second eccentric offset as the difference between the second axis of rotation comprising the foot peg axis and the foot peg centerline;
   vertically and horizontally adjusting the position of the foot peg over an area outside of an inner concentric circle centered on the collet axis, the inner concentric circle having a radius of the difference the first eccentric offset and the second eccentric offset; and
   vertically and horizontally adjusting the position of the foot peg over an area inside of an outer concentric circle centered on the collet axis, the outer concentric circle having a radius of the sum the first eccentric offset and the second eccentric offset.

12. The method of claim 9, wherein the step of fixing an angular position comprises:
   providing a slot in the bracket for enabling a friction fit between the bracket aperture and the collet by reducing a diameter of the bracket aperture;
   providing a slot in the collet for enabling a friction fit between the collet aperture and the foot peg pivot by reducing a diameter of the collet aperture; and
   tightening a single securing screw through the bracket slot for creating a friction fit between the bracket aperture and the collet by reducing the diameter of the bracket aperture, and for creating a friction fit between the collet aperture and the foot peg pivot by reducing the diameter of the collet aperture.

13. A dual eccentric adjustable motorcycle footrest apparatus, comprising:
   a bracket having a circular aperture fastened to a motorcycle frame;
   a rotatable circular collet placed within the circular bracket aperture, the circular collet having an eccentrically offset collet aperture with respect to a circular collet rotational axis;
   a foot peg rotatable with respect to a foot peg pivot placed within the collet aperture, the foot peg having an eccentrically offset positional relationship with respect to a foot peg pivot rotational axis; and
   means for fixing an adjusted position of the foot peg by securing an angular position of the collet in the bracket aperture and an angular position of the foot peg pivot in the collet aperture.

14. The apparatus of claim 13, further comprising:
   a first eccentric offset comprising a distance between the circular collet rotational axis and a collet aperture center; and
   a second eccentric offset comprising a distance between the foot peg pivot rotational axis and a centerline of the eccentrically offset foot peg.

15. The apparatus of claim 14, wherein:
   the foot peg is adjustable vertically and horizontally over a region defined by an area between an inner concentric circle centered at the circular collet axis of rotation and an outer concentric circle centered at the circular collet axis of rotation;
   the inner concentric circle having a radius of the difference between first eccentric offset and the second eccentric offset; and
   the outer concentric circle having a radius of the sum of first eccentric offset and the second eccentric offset.

16. The apparatus of claim 15, wherein:
   the inner concentric circle is defined as that circumscribed by the foot peg centerline during a 360° rotation of the rotatable circular collet with the foot peg centerline in a position as close as possible to the center of rotation of the rotatable circular collet; and
   the outer concentric circle is defined as that circumscribed by the foot peg centerline during a 360° rotation of the rotatable circular collet with the foot peg centerline in a position as far as possible from the center of rotation of the rotatable circular collet.

17. The apparatus of claim 13, wherein:
   the bracket includes a slot that is contracted when a securing screw is tightened into a threaded hole for fixing a position of the rotatable circular collet; and
   the rotatable circular collet includes a slot that is contracted when the securing screw is tightened into the threaded hole for fixing the position of the foot peg.

18. The apparatus of claim 13, wherein the rotatable foot peg pivot is fixed in a position using a splined collet aperture and a matching spline on the rotatable foot peg pivot.

19. The apparatus of claim 13, wherein the rotatable foot peg pivot is fixed in position using a threaded fastener and a tapered nut.

20. A dual eccentric adjustable motorcycle footrest kit capable of being assembled in the field, comprising:
   a bracket having a circular aperture adapted to be fastened to a motorcycle frame;
   a rotatable circular collet adapted to be placed within the circular bracket aperture, the circular collet having an eccentrically offset collet aperture with respect to a circular collet rotational axis;
   a foot peg rotatable with respect to a foot peg pivot adapted to be placed within the collet aperture, the foot peg having an eccentrically offset positional relationship with respect to a foot peg pivot rotational axis; and
   means adapted for fixing an adjusted position of the foot peg by securing an angular position of the collet in the bracket aperture and an angular position of the foot peg pivot in the collet aperture.

* * * * *